United States Patent
Nguyen et al.

(10) Patent No.: US 10,031,569 B2
(45) Date of Patent: Jul. 24, 2018

(54) OUTPUT VOLTAGE TO SERIAL COMMUNICATION PORT

(71) Applicant: HEWLETT-PACKARD DEVELOPMENT COMPANY, L.P., Houston, TX (US)

(72) Inventors: Nam Nguyen, Houston, TX (US); Robert S Wright, Houston, TX (US); Binh T Truong, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 54 days.

(21) Appl. No.: 15/112,560

(22) PCT Filed: Jan. 31, 2014

(86) PCT No.: PCT/US2014/013984
§ 371 (c)(1),
(2) Date: Jul. 19, 2016

(87) PCT Pub. No.: WO2015/116124
PCT Pub. Date: Aug. 6, 2015

(65) Prior Publication Data
US 2016/0335093 A1    Nov. 17, 2016

(51) Int. Cl.
G06F 1/26     (2006.01)
G06F 1/32     (2006.01)
G06F 9/44     (2018.01)
G06F 9/4401   (2018.01)

(52) U.S. Cl.
CPC .............. *G06F 1/266* (2013.01); *G06F 1/26* (2013.01); *G06F 1/3296* (2013.01); *G06F 9/4401* (2013.01)

(58) Field of Classification Search
CPC .......... G06F 1/266; G06F 1/26; G06F 1/3296; G06F 9/4401
See application file for complete search history.

(56) References Cited

U.S. PATENT DOCUMENTS

| | | |
|---|---|---|
| 4,884,287 A | 11/1989 | Jones et al. |
| 5,519,634 A | 5/1996 | Matsuura et al. |
| 5,691,630 A | 11/1997 | Chosa |
| 5,864,225 A | 1/1999 | Bryson |
| 7,239,540 B2 | 7/2007 | Inoue |
| 7,719,134 B2 | 5/2010 | Hashimoto et al. |
| 2002/0162036 A1 | 10/2002 | Kim et al. |
| 2005/0204070 A1 | 9/2005 | Shaver et al. |
| 2008/0282075 A1 | 11/2008 | Hsu et al. |
| 2011/0258357 A1 | 10/2011 | Lin |
| 2011/0276812 A1 | 11/2011 | Lee et al. |
| 2012/0226929 A1 | 9/2012 | Lee |

FOREIGN PATENT DOCUMENTS

JP    2007-249625 A    9/2007

OTHER PUBLICATIONS

Tomi Engdahl, "Get Power Out of PC RS-232 Port," Dec. 3, 2013 (retrieved from internet), pp. 1-5, Available at <epanorama.net/circuits/rspower.html>.

*Primary Examiner* — Stefan Stoynov
(74) *Attorney, Agent, or Firm* — HPI Patent Department

(57) ABSTRACT

One of a first voltage and a second voltage may be selected based on input from a basic input/output system (BIOS). One of the selected voltage and no voltage may be output to a carrier detect (CD) pin and a ring Indicator (RI) pin of a serial communication port, based on the input from the BIOS.

15 Claims, 3 Drawing Sheets

OUTPUT VOLTAGE TO SERIAL COMMUNICATION PORT

BACKGROUND

A device may include a serial communication port, such as a COM port. Generally, these serial communication ports do not provide power. However, in some instances, the device may provide power to peripheral devices connected to the device, via the serial communication port. Manufacturers, vendors, and/or service providers may be challenged to provide more efficient ways to power the peripheral devices via the serial communication ports.

BRIEF DESCRIPTION OF THE DRAWINGS

The following detailed description references the drawings, wherein.

DETAILED DESCRIPTION

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A device may include a serial communication port, such as a COM port. These serial communication ports were originally designed to only provide data. However, some devices may provide power through the serial communication pert by repurposing one or more data pins of the serial communication port to provide power. Thus, devices may include additional power circuitry to redirect power of the device to the serial communication port.

For example, powered serial communication ports continue to be heavily utilized in retail point of sale (POS) systems, such as registers. However, current power circuitry utilizes separate circuitry for each power state (0V, 5V, and 12V) of the serial communication port. This may create redundancy within the serial power communication port circuitry, especially on a system with multiple integrated communication ports.

Examples may reduce redundancy of power circuitry for a serial communication port. An example device may include a voltage selection unit and a power unit. The voltage selection unit may toggle between a first voltage and a second voltage based on input from a basic input/output system (BIOS). The power unit may output one of the toggled voltage and no voltage to a serial communication port based on the input from the BIOS. The power unit may output to a carrier detect (CD) pin and a ring Indicator (RI) pin of the serial communication port.

By leveraging a same serial power circuitry for each serial power slate, examples may reduce the circuit size and cost, while retaining a same level of performance and system stability of the serial protocol. Reductions in circuit size, and cost may be even greater if the system or device includes a plurality of integrated serial communication ports.

Figure 1:
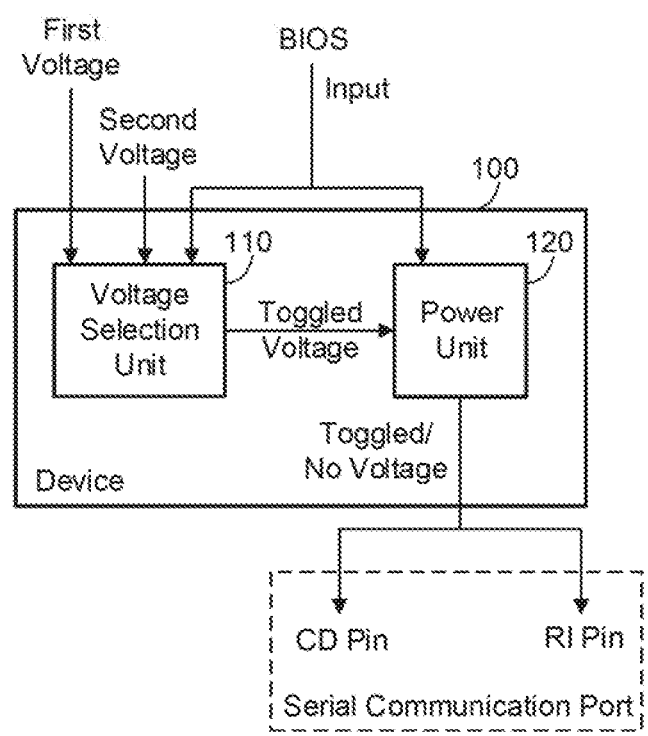
FIG. 1 is an example block diagram of a device to output voltage to a serial communication port.

Referring now to the drawings, FIG. 1 is an example block diagram of a device 100 to output voltage to a serial communication port. The device 100 may couple to or be included in any type of computing device to include a serial communication port, such as a notebook computer, a desktop computer, an all-in-one system, a server, a network device, a wireless device, a storage device, a thin client, a retail point of sale device, a gaming device, a scientific instrument, and the like.

In the example of FIG. 1, the device 100 includes a voltage selection unit 110 and a power unit 120. The voltage selection and power units 110 and 120 may include, for example, a hardware device including electronic circuitry for implementing the functionally described below, such as control logic and/or memory. In addition or as an alternative, the voltage selection and power units 110 and 120 may be implemented as a series of instructions encoded on a machine-readable storage medium and executable by a processor.

The voltage selection unit 110 may toggle between a first voltage and a second voltage based on input from a basic input/output system (BIOS). For example, the BIOS may transmit a first select and a second select (not shown) to the device 100. The first and second selects may be determined based on a type of peripheral device to connect to the serial communication port. Example types of peripheral devices may include a mouse, receipt printer, key pad, scanner, credit card reader, bar code reader, signature authentication device, security deactivation device, and the like.

The first and second selects may be determined automatically, such as by detecting the type of the device connected to the serial communication port and/or manually, such as by a user navigating a graphical user interface to the BIOS to set values for the first and second selects. The voltage selection unit 110 may receive the first and second from voltage rails (not shown). The term voltage rail may refer to a single voltage provided by a power supply unit (PSU).

The voltage selection unit 110 may toggle between the first and second voltages based on the first and second selects. For instance, the voltage selection unit 110 may toggle to the first voltage if the first select and/or the second select are at a logic low. Further, the voltage selection unit 110 may toggle to the second voltage if the first and second selects are both at a logic high.

The logic high and logic low may relate to logic levels, which are part of a finite number of states that a signal can have. Logic levels may usually be represented by the voltage difference between the signal and ground (or some other common reference point). Here, the logic high may correspond to a binary 1 and the logic low may correspond to a binary 0. When a voltage is below a first threshold, such as ⅓ of a supply voltage, it may be interpreted as the logic low. When the voltage is above a second threshold voltage, such as ⅔ of a supply voltage, it may be interpreted as the logic high.

The power unit 120 may output one of the toggled voltage (such as the first or second voltage) and no voltage (such as 0 volts) based on the first select to a serial communication port. For instance, the power unit 120 may output the toggled voltage if the first select is at the high logic level and output no voltage if the first select is at the low logic level.

The power unit may output one of the toggled voltage and no voltage to both a carrier detect (CD) pin and a ring Indicator (RI) pin of a serial communication port, such as a COM Port. The serial communication port may be compliant with an RS-232 standard and includes at least one of a DA, DB, DC, DD, and DE sized connector. In one example, the first voltage may be five volts and the second voltage may be twelve volts. The serial communication port may include nine pins. The CD pin may correspond to a first pin of the nine pins and the RI pin may correspond to a ninth pin of the nine pins.

Figure 2:
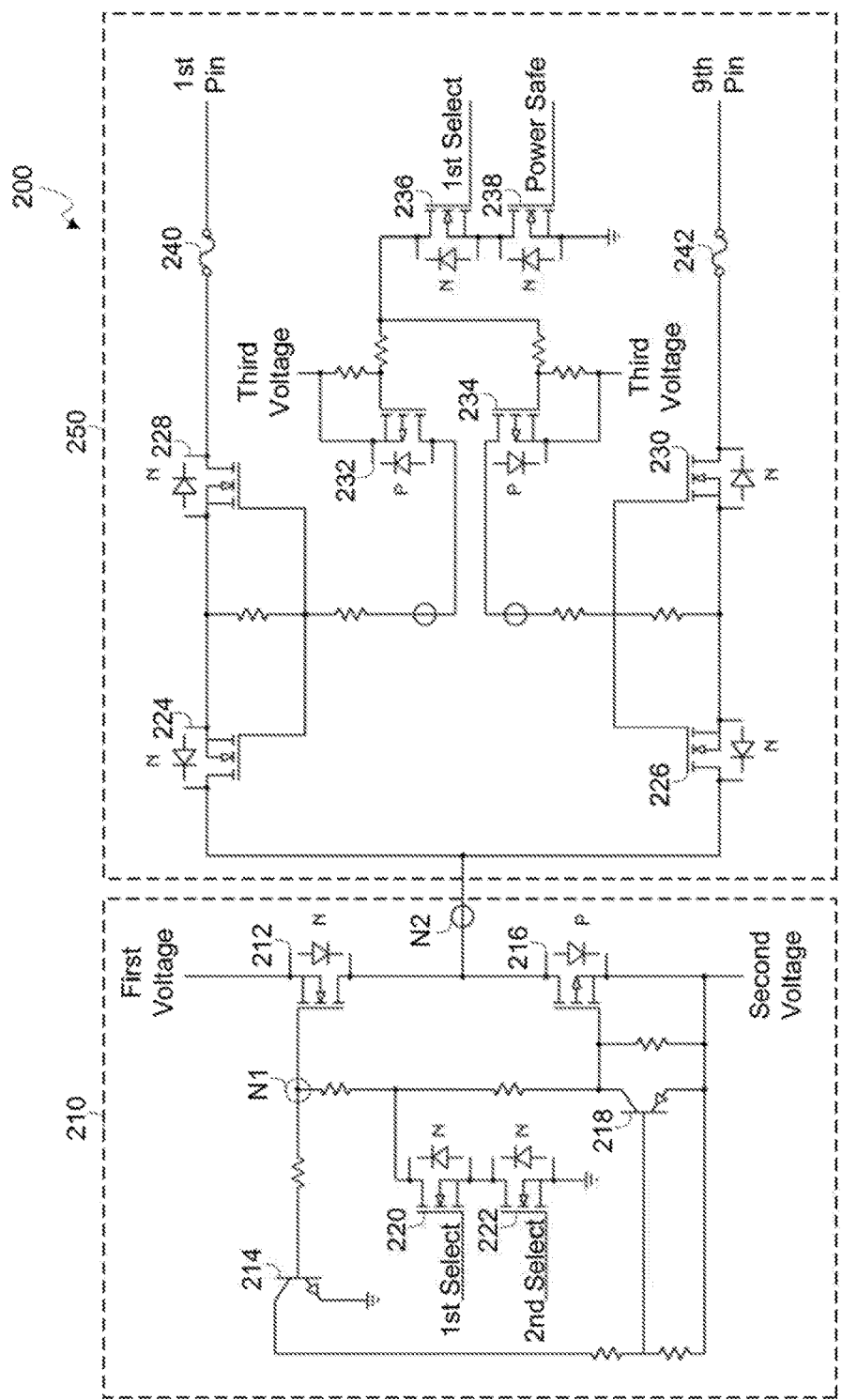
FIG. 2 is another example circuit diagram of a device to output voltage to a serial communication port.

FIG. 2 is another example circuit diagram of a device 200 to output voltage to a serial communication port. The device 200 may couple to or be included in any type of computing device to include a serial communication port, such as a notebook computer, a desktop computer, an all-in-one system, a server, a network device, a wireless device, a storage device, a thin client, a retail point of sale device, a gaming device, a scientific instrument, and the like.

The device 200 of FIG. 2 may include at least the functionality and/or hardware of the device 100 of FIG. 1. For example, the device 200 of FIG. 2 includes a voltage selection unit 210 that includes the functionality and/or hardware of the voltage selection unit 110 of FIG. 1 and a power unit 250 that includes the functionality and/or hardware of the power unit 120 of FIG. 1 download unit 110.

The voltage selection unit 210 includes the first voltage connected to a source of a first transistor 212. A first node N1 is connected to a gate of the first transistor 212, a base of a second transistor 214, a gate of a third transistor 216 and a collector of a fourth transistor 218. The second voltage is connected to a source of the third transistor 216, a collector of the second transistor 214, an emitter of the fourth transistor 218 and the first node N1. An emitter of the second transistor 214 is connected to a ground.

The voltage selection unit 210 further includes a drain of the first transistor 212 connected to an output node N2. A drain of the third transistor 216 is also connected to the output node N2. The first select of the BIOS is connected to a gate of a fifth transistor 220 and the second select of the BIOS connected to a gate of a sixth transistor 222. The first node N1 is connected to a drain of the fifth transistor 220, a source of the fifth transistor 220 is connected to a drain of the sixth transistor 222 and a source of the sixth transistor 222 is connected to a ground.

The power unit 250 includes drains of seventh and eight transistors 224 and 226 connected to the output node N2. A source of the seventh transistor 224 is connected to a source of a ninth transistor 228. A source of the eighth transistor 228 is connected to a source of a tenth transistor 230. A drain of the ninth transistor 228 is connected to the first pin of the serial communication port. A drain of the tenth transistor 230 is connected to the ninth pin of the serial communication port.

The power unit 250 further includes gates and the sources of the seventh and ninth transistors 224 and 228 connected to a drain of an eleventh transistor 232. Gates and the sources of the eighth and tenth transistors 228 and 230 are connected to a drain of a twelfth transistor 234. Sources and gates of the eleventh and the twelfth transistors 232 and 234 are connected to a third voltage greater than the first and second voltages, such as 17 volts.

The power unit 250 further includes the first select connected to a gate of a thirteenth transistor 236 and the third voltage connected to a drain of the thirteenth transistor 236. A source of the thirteenth transistor 238 is connected to a drain of a fourteenth transistor 238, a source of the fourteenth transistor 238 is connected to a ground and a gate of the fourteenth transistor 238 connected to a power safe signal. The power safe signal may be at a high logic level if all power rails (not shown) of the device are operating properly. For example, circuitry and/or control logic of the device 200 may check that power rails supplying the first, second and third voltages are properly supplying voltages before flipping the power safe signal from the logic low level to the logic high level.

A first fuse 240 is between the first pin and the ninth transistor 228. A second fuse 242 is between the ninth pin and the tenth transistor 230. The first, fifth, sixth, seventh, eighth, ninth, tenth, thirteenth and fourth transistors 212, 220, 222, 224, 226, 228, 230, 236 and 238 may be N-channel metal-oxide-semiconductor field-effect transistors (MOSFET). The third, eleventh and twelfth transistors 218, 232 and 234 may be P-channel MOSFETs. Further, all of the MOSFETs may be enhancement mode MOSFETs. The second transistor 214 may be an NPN bipolar junction transistor (BJT), and the fourth transistor 218 may be PHP BJT.

The first voltage may be lower than the second voltage. For instance, the first voltage may be 5 volts and the second voltage may be 12 volts. Thus, in operation, the voltage selection unit 210 may output the first voltage by default, such as if either of the first or second select or at the logic low. In this case, the second voltage may turn on the first transistor 212 and turn off the third transistor 216, causing the first voltage to be outputted to the output node N2 though the first transistor. However, if both the first and second selects are at the logic high, both the fifth and sixth transistors 220 and 222 may be turned on. In this case, the second voltage may be driven to the ground connected to the sixth transistor 222, thus causing the first transistor 212 to turn off and the third transistor 216 to turn on. Here, the voltage selection unit 210 may toggle to output the second voltage to the output node N2.

The power unit 222 may output the voltage at the output node N2 to both the first and second pins. If the first select and the power safe signal are both at the high logic level. In this case, both the thirteen and fourteenth transistors 238 and 238 are turned on. This causes the third voltage to be driven to the ground, thus causing the eleventh and twelfth transistors 232 and 234 to be turned on. In turn, the seventh, eighth, ninth and tenth transistors 224, 226, 228 and 230 are turned on, thus providing the toggled voltage of the voltage selection unit 210 to the first and ninth pins. However, if either of the first select and the power safe signal are at the low logic level, the seventh, eighth, ninth and tenth transistors 224, 226, 228 and 230 are fumed off. Here, the power unit 250 will not pass on the toggled voltage of the voltage selection unit 210, and no voltage will be output to the first and ninth pins.

Figure 3:
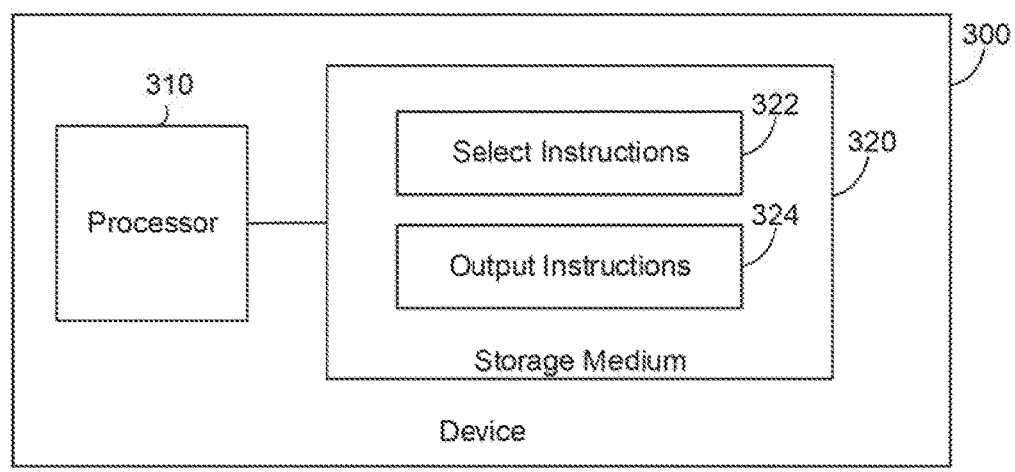
FIG. 3 is an example block diagram of a computing device including instructions for outputting voltage to a serial communication port.

FIG. 3 is an example block diagram of a computing device 300 including instructions for outputting voltage to a serial communication port. In the embodiment of FIG. 3, the computing device 300 includes a processor 310 and a machine-readable storage medium 320. The machine-readable storage medium 320 further includes instructions 322 and 324 for outputting voltage to a serial communication port.

The computing device 300 may be included in or part of, for example, a microprocessor, a display, a controller, a notebook computer, a desktop computer, an all-in-one system, a server, a network device, a wireless device, or any other type of device capable of executing the instructions 322 and 325. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 320, or combinations thereof. The processor 310 may fetch, decode, and execute instructions 322 and 324 to implement outputting voltage to the serial communication port. As an alternative or in addition to retrieving and executing instructions, the processor 310 may include at least one integrated circuit (IC), other control logic, other electronic circuits, or combinations thereof mat include a number of electronic components for performing the functionality of instructions 322 and 324.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for outputting voltage to the serial communication port.

Figure 4:
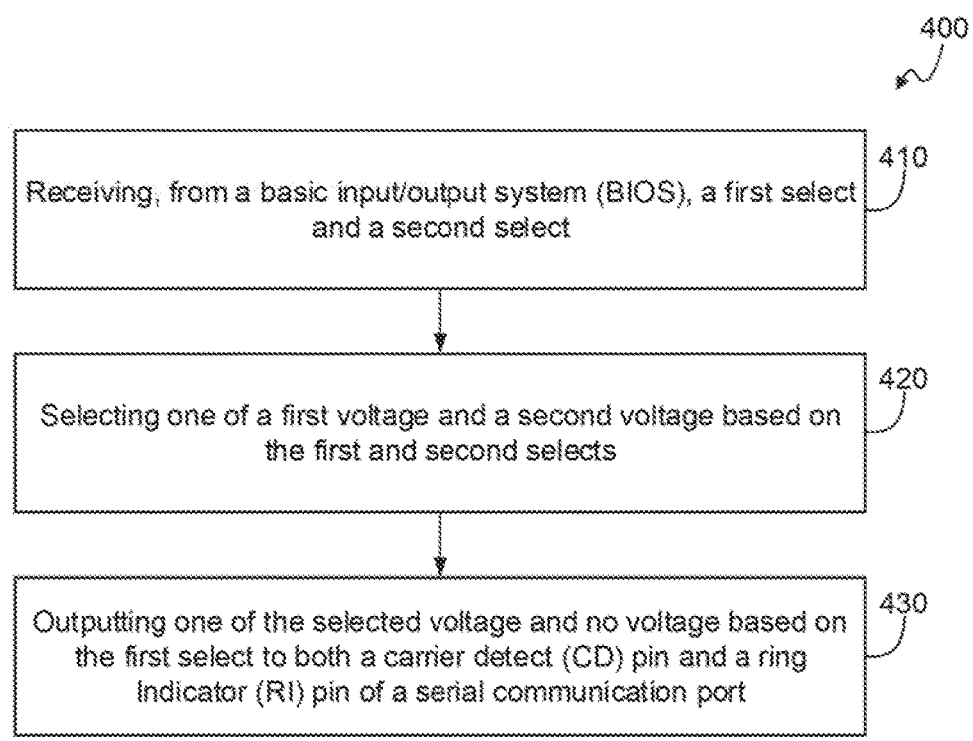
FIG. 4 is an example flowchart of a method for outputting voltage to a serial communication port.

Moreover, tie instructions 322 and 324 when executed by a processor (e.g., via one processing element or multiple processing elements of the processor) can cause the processor to perform processes, such as, the process of FIG. 4. For example, the select instructions 322 may be executed by the processor 310 to select, at a BIOS, a logic of a first select and a logic of a second select. The logic of the first and second selects may selected via a graphical user interface (GUI) based on a type of device to be connected to the serial communication port The output instructions 324 may be executed by the processor 310 to output the first and second selects to a power select circuit, such as the device 100 or 200. The power select circuit may select one of a first voltage and a second voltage based on the first and second selects. Further, the power select circuit may output one of the selected voltage and no voltage based on the first select to a serial communication port. For example, the power select circuit may output one of the selected voltage and no voltage to both a carrier detect (CD) pin and a ring Indicator (RI) pin of the serial communication port.

FIG. 4 is an example flowchart of a method 400 for outputting voltage to a serial communication port. Although execution of the method 400 is described below with reference to the device 100, other suitable components for execution of the method 400 can be utilized, such as the device 200. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the device 100 receives a first select and a second select from a BIOS. At block 420, the device 100 selects one of a first voltage and a second voltage based on the first and second selects. The selecting, at block 420, may output the first voltage by default, such as if the first and second selects are not received. The first voltage may be five volts and the second voltage may be twelve volts. At block 430, the device 100 outputs one of the selected voltage and no voltage based on the first select to both a carrier defect (CD) pin and a ring Indicator (RI) pin of a serial communication port. The outputting, at block 430, may not be based on the second select. The outputting, at block 430, may output no voltage by default, such as if the first select is not received.

We claim:

1. A device, comprising:
a voltage selection unit to toggle between a first voltage and a second voltage based on input from a basic input/output system (BIOS); and
a power unit to output one of the toggled voltage and no voltage to a serial communication port based on the input from the BIOS, wherein
the power unit is to output to a carrier detect (CD) pin and a ring Indicator (RI) pin of the serial communication port.

2. The device of claim 1, wherein,
the input from the BIOS includes a first select and a second select,
the voltage selection unit is to toggle between the first and second voltages based on the first and second selects, and
the power unit is to output one of the toggled voltage and no voltage based on the first select.

3. The device of claim 2, wherein,
the voltage selection unit is to select the first voltage if at least one of the first and second selects is at a logic low, and
the voltage selection unit is select the second voltage if the first and second selects are at a logic high.

4. The device of claim 3, wherein,
the first voltage is five volts and the second voltage is twelve volts, and
the serial communication port is compliant with an RS-232 standard and includes at least one of a DA, DB, DC, DD, and DE sized connector.

5. The device of claim 3, wherein the voltage selection unit includes,
the first voltage connected to a source of a first transistor,
a first node connected to a gate of the first transistor, a base of a second transistor, a gate of a third transistor, and a collector of a fourth transistor,
the second voltage connected to a source of the third transistor, a collector of the second transistor, an emitter of the fourth transistor and the first node, and
an emitter of the second transistor connected to a ground.

6. The device of claim 5, wherein the voltage selection unit further includes,
a drain of the first transistor connected to an output node,
a drain of the third transistor connected to the output node,
the first select connected to a gate of a fifth transistor and the second select connected to a gate of a sixth transistor, and
the first node connected to a drain of the fifth transistor, a source of the fifth transistor connected to a drain of the sixth transistor and a source of the sixth transistor connected to a ground.

7. The device of claim 6, wherein the power unit includes,
drains of seventh and eight transistors connected to the output node,
a source of the seventh transistor connected to a source of a ninth transistor, a source of the eighth transistor connected to a source of a tenth transistor, a drain of the ninth transistor connected to a first pin of the serial communication port, and a drain of the tenth transistor connected to a ninth pin of the serial communication on port.

8. The device of claim 7, wherein the power unit further includes, gates and the sources of the seventh and ninth transistors connected to a drain of an eleventh transistor, gates and sources of the eighth and tenth transistors connected to a drain of a twelfth transistor, and sources and gates of the eleventh and the twelfth transistors connected to a third voltage greater than the first and second voltages.

9. The device of claim 8, wherein the power unit further includes, the first select connected to a gate of a thirteenth transistor and the third voltage connected to a drain of the thirteenth transistor, and a source of the thirteenth transistor connected to a drain of a fourteenth transistor, a source of the fourteenth transistor connected to a ground and a gate of the fourteenth transistor connected to a power safe signal, wherein the power safe signal is at a high logic level if all if power rails of the device are operating properly.

10. The device of claim 9. further comprising:

a first fuse between the first pin and the ninth transistor; and a second fuse between the ninth pin and the tenth transistor, wherein, the serial communication port includes nine pins, with the CD pin to correspond to the first pin and the RI pin to correspond to the ninth pin.

11. The device of claim 10, wherein, the first, fifth, sixth, seventh, eighth, ninth, tenth, thirteenth and fourteenth transistors are N-channel metal-oxide-semiconductor field-effect transistors (MOSFET), third, eleventh and twelfth transistors are P-channel MOSFETs, the second transistor is an NPN bipolar junction transistor (BJT), and the fourth transistor is a PNP BJT.

12. A method, comprising:

receiving, from a basic input/output system (BIOS), a first select and a second select;

selecting one of a first voltage and a second voltage based on the first and second selects; and outputting one of the selected voltage and no voltage based on the first select to both a carrier detect (CD) pin and a ring Indicator (RI) pin of a serial communication port.

13. The method of claim 12, wherein, the selecting outputs the first voltage by default, the outputting outputs no voltage by default, and the outputting is not based on the second select.

14. A non-transitory computer-readable, storage medium storing instructions that, if executed by a processor of a device, cause the processor to:

select, at a basic input output system (BIOS), a logic of a tint select and a logic of a second select; and output the first and second selects to a power select circuit, wherein the power select circuit is to select one of a first voltage and a second voltage based on the first and second selects; and the power select circuit is to output one of the selected voltage and no voltage to both a carrier detect (CID) pin and a ring indicator (RI) pin of a serial communication port, based on the first select to the serial communication port.

15. The non-transitory computer-readable storage medium of claim 14, wherein, the logic of the first and second selects are selected via a graphical user interface (GUI) based on a type of device to be connected to the serial communication port.

* * * * *

UNITED STATES PATENT AND TRADEMARK OFFICE
CERTIFICATE OF CORRECTION

PATENT NO. : 10,031,569 B2  
APPLICATION NO. : 15/112560  
DATED : July 24, 2018  
INVENTOR(S) : Nam Nguyen et al.

Page 1 of 1

It is certified that error appears in the above-identified patent and that said Letters Patent is hereby corrected as shown below:

In Column 7, Line 6, Claim 7, after "communication" delete "on".

In Column 7, Line 26, Claim 9, delete "if all if" and insert -- if all --, therefor.

In Column 7, Line 28, Claim 10, delete "claim 9." and insert -- claim 9, --, therefor.

In Column 8, Line 18, Claim 14, delete "computer-readable," and insert -- computer-readable --, therefor.

In Column 8, Line 21, Claim 14, delete "input output" and insert -- input/output --, therefor.

In Column 8, Line 22, Claim 14, delete "tint" and insert -- first --, therefor.

In Column 8, Line 29, Claim 14, delete "(CID)" and insert -- (CD) --, therefor.

Signed and Sealed this  
Thirteenth Day of November, 2018

Andrei Iancu  
*Director of the United States Patent and Trademark Office*